(12) United States Patent
Wang et al.

(10) Patent No.: US 9,764,786 B2
(45) Date of Patent: Sep. 19, 2017

(54) LOCK

(71) Applicant: SINOX CO., LTD, New Taipei (TW)

(72) Inventors: Chia-Hung Wang, New Taipei (TW); Chung-Yi Huang, New Taipei (TW)

(73) Assignee: SINOX CO., LTD, New Taipei (TW)

(*) Notice: Subject to any disclaimer, the term of this patent is extended or adjusted under 35 U.S.C. 154(b) by 0 days.

(21) Appl. No.: 15/094,103

(22) Filed: Apr. 8, 2016

(65) Prior Publication Data

US 2016/0298364 A1    Oct. 13, 2016

Related U.S. Application Data

(60) Provisional application No. 62/145,775, filed on Apr. 10, 2015.

(51) Int. Cl.
*B62H 5/00* (2006.01)
*B62J 11/00* (2006.01)

(52) U.S. Cl.
CPC .............. *B62H 5/001* (2013.01); *B62J 11/00* (2013.01)

(58) Field of Classification Search
CPC ... B62H 5/001; B62J 11/00; B62J 2099/0033; B62J 99/00; F16B 2/10; Y10T 403/32918
USPC .................. 224/412, 419, 420, 459, 441
See application file for complete search history.

(56) References Cited

U.S. PATENT DOCUMENTS

| | | | | |
|---|---|---|---|---|
| 648,159 | A * | 4/1900 | Bartsch | B62J 11/00 224/425 |
| 4,702,447 | A * | 10/1987 | Westwood, III | B63B 21/46 24/598.5 |
| 5,096,150 | A * | 3/1992 | Westwood | B63B 21/46 248/231.51 |
| 6,926,242 | B2 * | 8/2005 | Hall | B25B 5/103 224/420 |
| D526,079 | S * | 8/2006 | Heun | D26/60 |
| 7,980,912 | B2 * | 7/2011 | Shoptaugh | A63H 33/042 446/120 |
| 8,627,990 | B2 * | 1/2014 | Nakajima | B62J 9/008 224/420 |
| 8,651,350 | B2 * | 2/2014 | Onogi | B62J 11/00 224/419 |
| 8,727,192 | B2 * | 5/2014 | Lai | B60R 11/0241 224/282 |
| 8,757,461 | B2 * | 6/2014 | Zanetti | B60R 11/02 224/483 |
| 8,931,795 | B1 * | 1/2015 | Gu | B60R 11/00 224/420 |
| 2003/0106919 | A1 * | 6/2003 | Chuang | B62J 11/00 224/420 |
| 2014/0312086 | A1 * | 10/2014 | Whitten | G06F 1/1656 224/420 |

* cited by examiner

*Primary Examiner* — Peter Helvey
(74) *Attorney, Agent, or Firm* — Innovation Capital Law Group, LLP; Vic Lin (57) ABSTRACT

A lock is provided. The lock includes a fixing base, an elastic member disposed on the fixing base, a stopper disposed above the elastic member, a numbering plate disposed above the stopper, a rotating disc disposed above the numbering plate, and a buckle seat disposed on the rotating disc. At least a portion of the stopping part is able to pass through the numbering plate. The rotating disc caps outside the numbering plate, the stopper, and at least a portion of the fixing base.

12 Claims, 12 Drawing Sheets

LOCK

BACKGROUND OF THE INVENTION

1. Field of the Invention

The present invention generally relates to a lock.

2. Description of the Prior Art

In order to use electronic devices more conveniently, users often fix the electronic devices on the frame of their bikes with fixtures while riding their bikes.

The electronic devices include GPS track recording devices and life tracking devices.

The electronic devices are costly. However, ordinary fixtures lack the function of locking. Hence, the electronic devices become targets of the thieves. It is an issue for extending the time for the thieves to steal the electronic devices, hence to lower the thief's intention of stealing and decrease the possibility of the electronic devices being stolen.

SUMMARY OF THE INVENTION

An object of the present invention is to provide a lock which can lock an electronic device on a frame.

The lock includes a fixing base, an elastic member disposed on the fixing base, a stopper disposed above the elastic member, a numbering plate disposed above the stopper, a rotating disc disposed above the numbering plate, and a buckle seat disposed on the rotating disc.

The stopper includes a stopper bottom plate, two stopping parts disposed on the opposite sides of the stopper bottom plate, and a linking-up side edge extending from the bottom end of the stopping part. At least a portion of the stopping part is able to pass through the numbering plate, wherein at least a portion of the linking-up side edge engages with the numbering plate.

The rotating disc caps outside the numbering plate, the stopper, and at least a portion of the fixing base, wherein the rotating disc includes an inner flange engaging with the numbering plate.

The buckle seat includes a buckle bottom plate and two fixing arms. The buckle bottom plate passes through the rotating disc and is fixed on the fixing base. The two fixing arms are disposed on the opposite sides of the buckle bottom plate. The stopper bottom plate is disposed between the buckle bottom plate and the fixing base. The upper end of the fixing arm respectively extends inward and outward the buckle seat to form a first restricting part and a second restricting part, wherein the inner flange is disposed between the second restricting part and the fixing base.

The numbering plate is circular. The rotating disc is circular. The numbering plate further has a slot disposed on the outer circumference of the numbering plate. There are four slots disposed in symmetry. The rotating disc further includes a positioning pin disposed with respect to the slot, wherein the positioning pin is movable in the slot.

In one embodiment, the lock includes a fixing base, a buckle seat disposed on the fixing base, an elastic member disposed between the fixing base and the buckle seat, a stopper disposed between the elastic member and the buckle seat, a numbering plate disposed between the stopper and the buckle seat, and a rotating disc disposed between the numbering plate and the buckle seat. The buckle seat includes a buckle bottom plate fixed on the fixing base and two fixing arms disposed on the opposite sides of the buckle bottom plate, wherein the upper end of the fixing arm respectively extends inward and outward the buckle seat to form a first restricting part and a second restricting part. The stopper includes a stopper bottom plate and a linking-up side edge. Two stopping parts are disposed on the opposite sides of the stopper bottom plate. The linking-up side edge extends from the bottom end of the stopping part. At least a portion of the stopping part is able to pass through the numbering plate, wherein at least a portion of the linking-up side edge engages with the numbering plate. The rotating disc caps outside the numbering plate, the stopper, and at least a portion of the fixing base, wherein the rotating disc includes an inner flange engaging with the numbering plate, wherein the buckle bottom plate passes through the rotating disc and fixed on the fixing base.

BRIEF DESCRIPTION OF THE DRAWINGS

FIGS. 6A to 9B are schematic views showing the operation of the present invention.

DETAILED DESCRIPTION OF THE PREFERRED EMBODIMENT

Figure 1A:
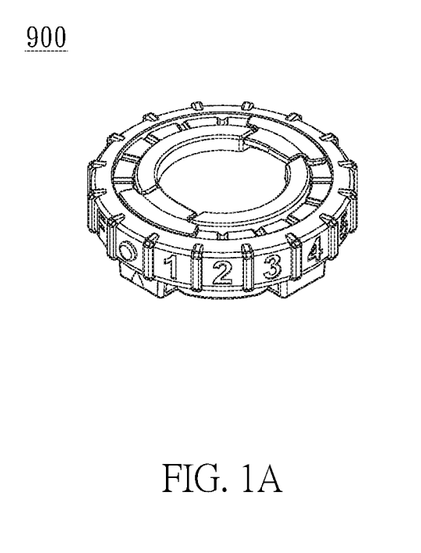
FIGS. 1A and 1B illustrate an embodiment of the present invention.
Figure 1B:
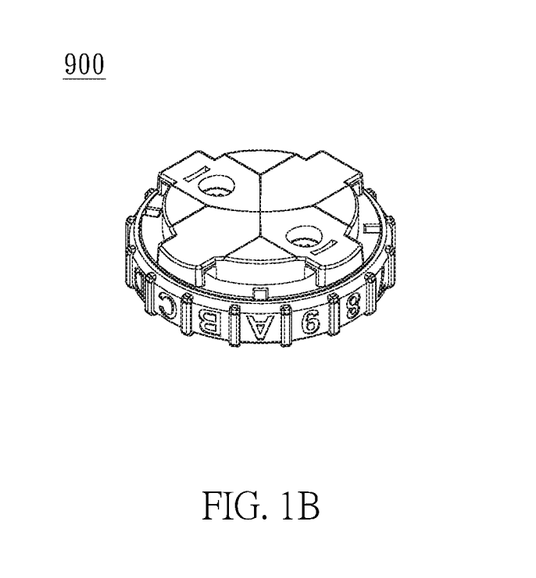
Figure 1C:
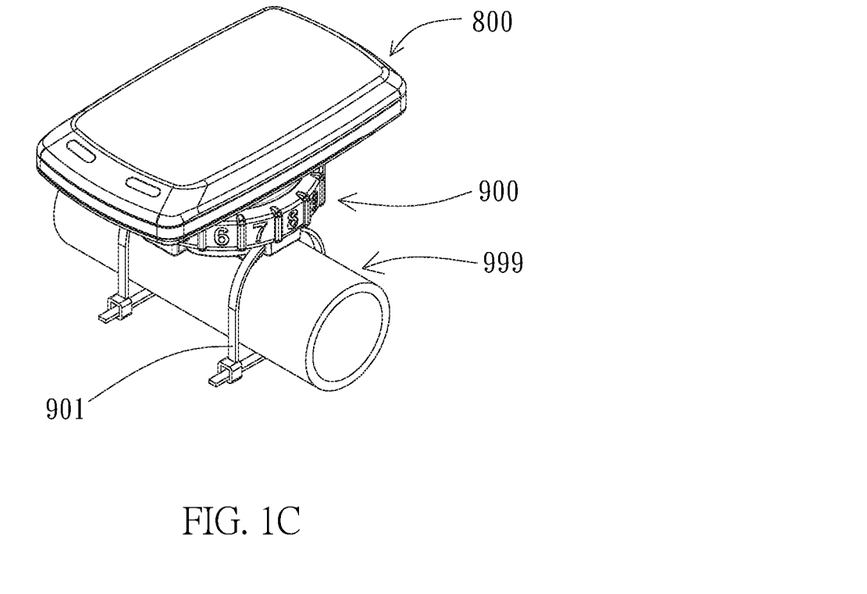
FIGS. 1C and 1D illustrate an embodiment of locking an electronic device on a frame by the present invention.
Figure 1D:
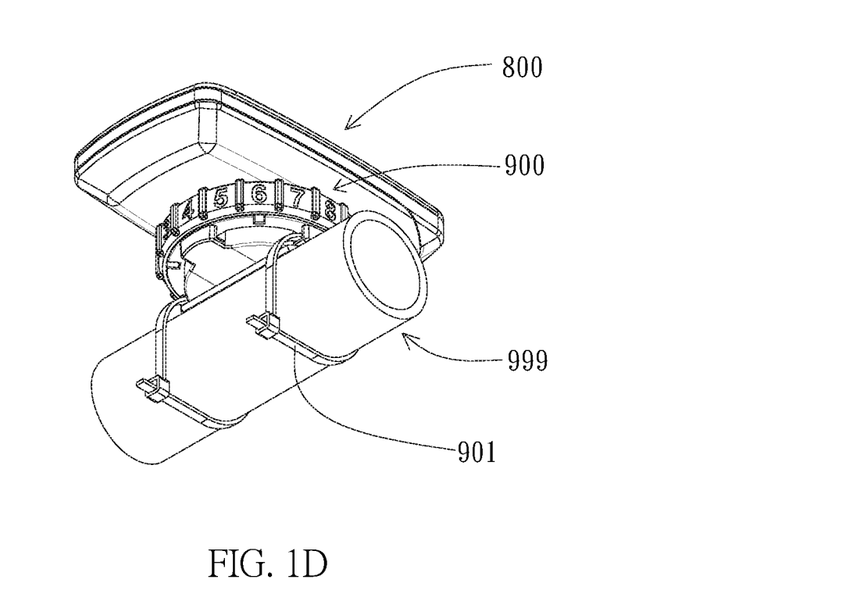

FIGS. 1A and 1B illustrate different views of an embodiment of the lock 900 of the present invention. As the embodiments shown in FIGS. 1C and 1D, the lock 900 of the present invention is for use with an electronic device 800 and a frame 999. More particularly, in this embodiment, the lock 900 is bound to the frame 999 with girdle 901, wherein the electronic device 800 is locked on the frame 999 via the lock 900. The frame 999 includes a bike frame. The electronic device 800 includes a GPS track recording device, a life tracking device, etc. In different embodiments, however, the lock 900 is fixed on an object other than the frame 999 by different approaches such as welding, sticking, screwing, etc., wherein the electronic device 800 is locked on the object via the lock 900.

Figure 2:
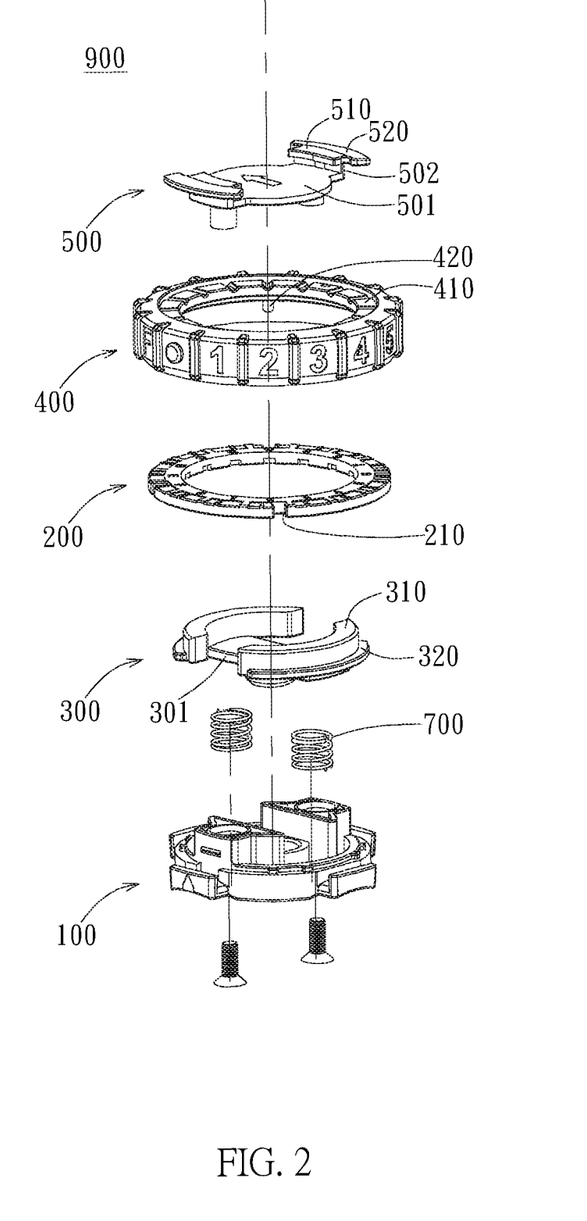
FIG. 2 is an exploded view of an embodiment of the present invention.
Figure 3A:
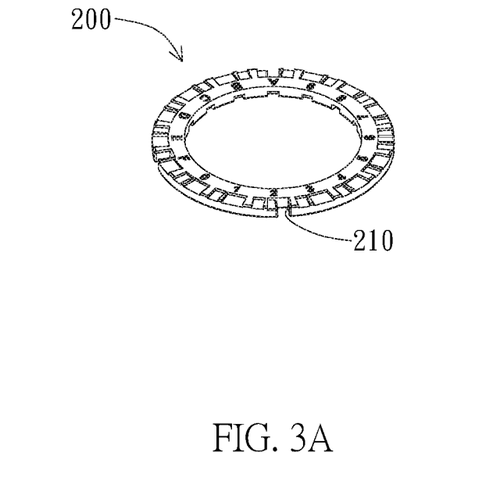
FIGS. 3A and 3B illustrate an embodiment of the numbering plate of the present invention.
Figure 3B:
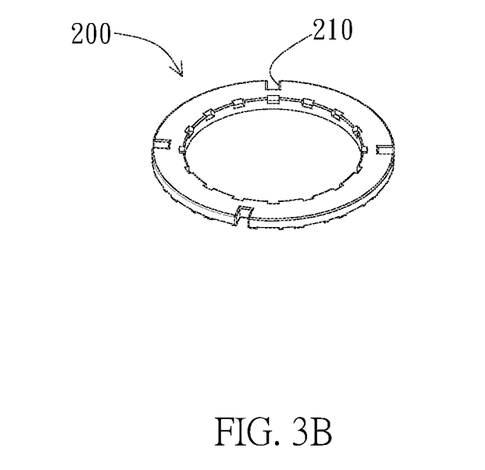

As the embodiment shown in FIGS. 2, 3A, and 3B, the lock 900 includes a fixing base 100, an elastic member, a stopper 300, a numbering plate 200, a rotating disc 400, and a buckle seat 500. The elastic member 700 is disposed on the fixing base 100, wherein two elastic members 700 are preferably disposed in pairs.

Figure 4A:
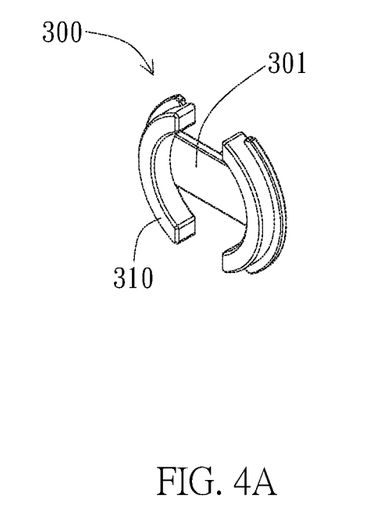
FIGS. 4A and 4B illustrate an embodiment of the stopper of the present invention.
Figure 4B:
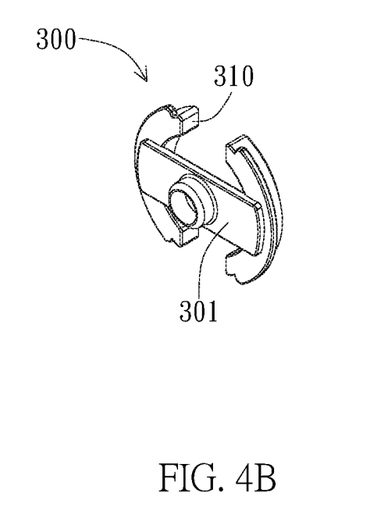

As the embodiment shown in FIGS. 2, 4A, and 4B, the stopper 300 is disposed above the elastic member 700, i.e. disposed on the side of the elastic member 700 opposite to the fixing base 100. Taking a different point of view, the elastic member 700 is disposed between the stopper 300 and the fixing base 100 for providing an elastic force in the direction opposite to that of the stopper 300 moving toward the fixing base 100.

The numbering plate 200 is preferably circular and is disposed above the stopper 300. The stopper 300 includes a stopper bottom plate 301 and a stopping part 310, wherein at least a portion of the stopping part 310 is able to pass through the numbering plate 200. Two stopping part 310 are preferably disposed in pair on opposite sides of the stopper bottom plate 301. The stopper 300 further has a linking-up side edge 320 preferably extending from the bottom end of the stopping part 310, wherein at least a portion of the linking-up side edge 320 engages with the numbering plate 220.

As the embodiment shown in FIG. 2, the rotating disc 400 is preferably circular and is disposed above the numbering plate 200 and caps outside the numbering plate 200, the stopper 300, and at least a portion of the fixing base 100. The rotating disc 400 includes an inner flange 410 engaging with the numbering plate 200. The rotating disc 400 further includes a positioning pin 420 disposed corresponding to the slot 210, wherein the numbering plate 200 further has a slot 210 disposed on the outer circumference of the numbering plate 200. The positioning pin 420 is movable in the slot 210. Accordingly, the stability of the rotating disc 400 is increased while it moves with respect to the fixing base 100. Preferably, there are four slots 210 and corresponding four positioning pins 420 disposed in symmetry.

Figure 5A:
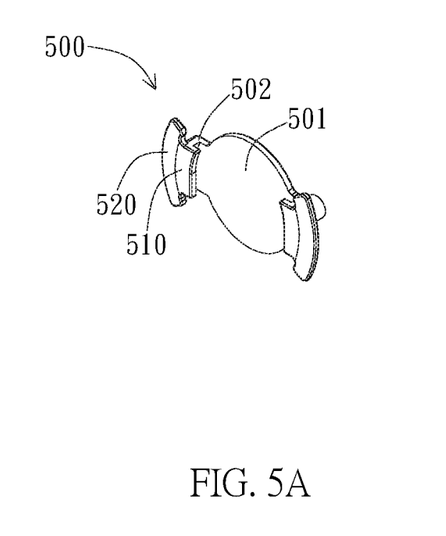
FIGS. 5A and 5B illustrate an embodiment of the buckle seat of the present invention.
Figure 5B:
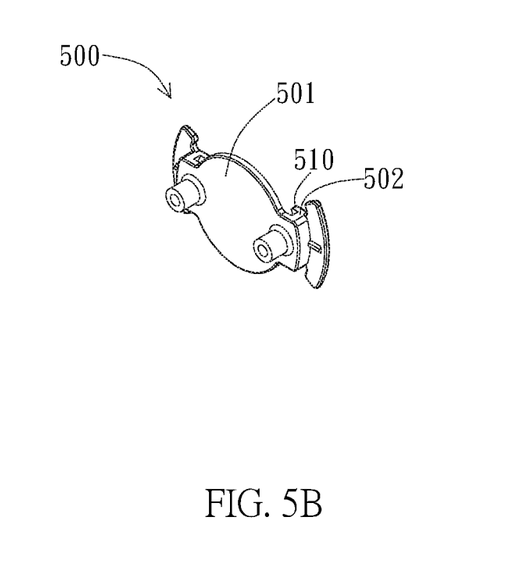

As the embodiment shown in FIGS. 2, 5A, and 5B, the buckle seat 500 is disposed on the rotating disc 400 and includes a buckle bottom plate 501 and a fixing arm 502. The buckle bottom plate 501 passes through the rotating disc 400 and is fixed on the fixing base 100. The stopper bottom plate 301 is disposed between the buckle bottom plate 501 and the fixing base 100. In this embodiment, two fixing arms 502 are disposed on opposite sides of the buckle bottom plate 501. The upper end of the fixing arm 502 respectively extends inward and outward the buckle seat 500 to form a first restricting part 510 and a second restricting part 520. The inner flange 410 of the rotating disc 400 is disposed between the second restricting part 520 and the fixing base 100.

When the elastic member 700 provides the stopping part 310 an elastic force in the direction opposite to that toward the fixing base 100, the numbering plate 200 and the rotating disc 400 in the direction opposite to that toward the fixing base 100 are pushed by the linking-up side edge 320 of the stopping part 310 and are stopped by the second restricting part 520 of the buckle seat 500.

Taking a different point of view, the lock 900 includes a fixing base 100, a buckle seat 500 disposed on the fixing base 100, an elastic member 101 disposed between the fixing base 100 and the buckle seat 500, a stopper 300 disposed between the elastic member 700 and the buckle seat 500, a numbering plate 200 disposed between the stopper 300 and the buckle seat 500, and a rotating disc 400 disposed between the numbering plate 200 and the buckle seat 500. The buckle seat 500 includes a buckle bottom plate 501 fixed on the fixing base 100 and two fixing arms 502 disposed on the opposite sides of the buckle bottom plate 501, wherein the upper end of the fixing arm 502 respectively extends inward and outward the buckle seat 500 to form a first restricting part 510 and a second restricting part 520. The stopper 300 includes a stopper bottom plate 301 and a linking-up side edge 320. Two stopping parts 310 are disposed on the opposite sides of the stopper bottom plate 301. The linking-up side edge 320 extends from the bottom end of the stopping part 310. At least a portion of the stopping part 310 is able to pass through the numbering plate 200, wherein at least a portion of the linking-up side edge 320 engages with the numbering plate 200. The rotating disc 400 caps outside the numbering plate 200, the stopper 300, and at least a portion of the fixing base 100, wherein the rotating disc 400 includes an inner flange 410 engaging with the numbering plate 200, wherein the buckle bottom plate 501 passes through the rotating disc 400 and fixed on the fixing base 100.

Figure 6A:
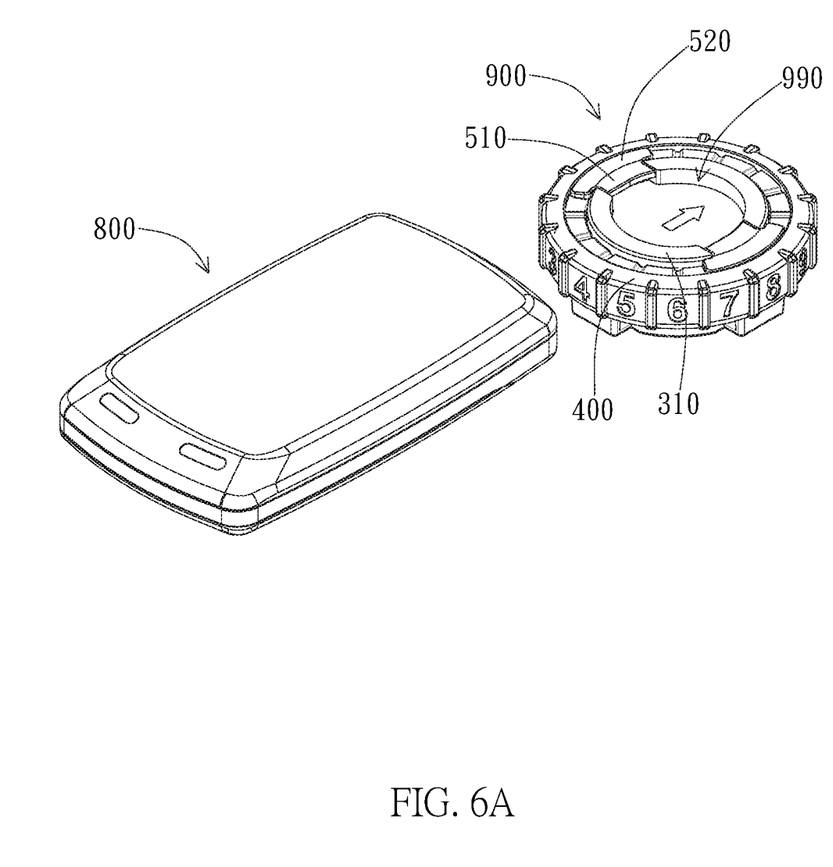
Figure 6B:
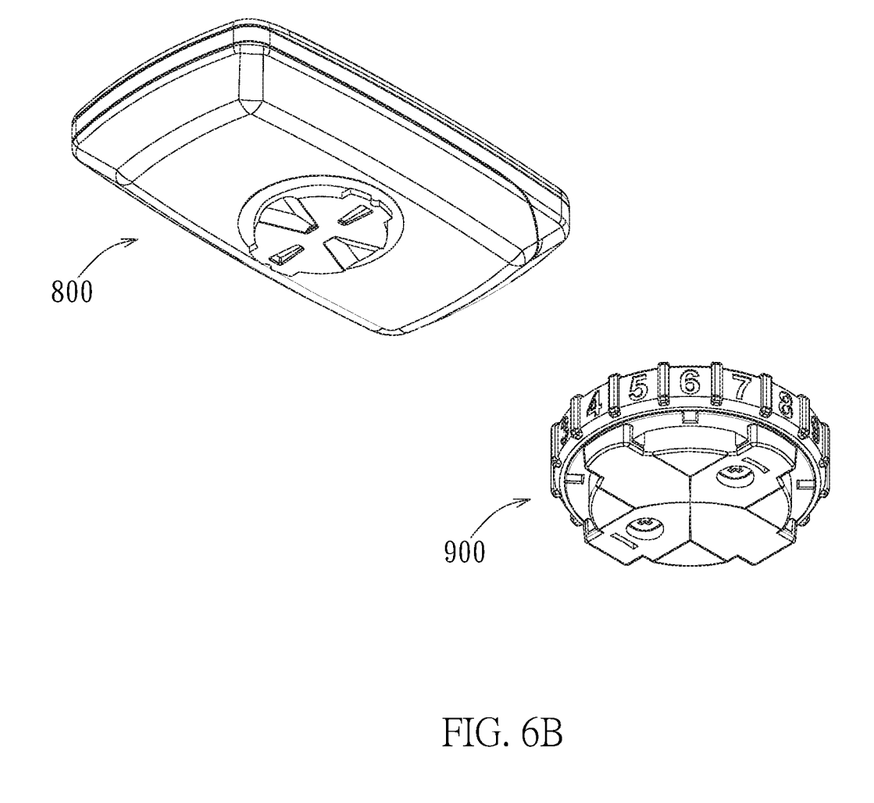

The operation of the lock 900 of the present invention is further described as below. As shown in FIGS. 6A and 6B, under normal circumstance, the stopper 300, the numbering plate 200 and the rotating disc 400 move upward in accordance with the elastic force of the elastic member 700 (see FIG. 2) and are restricted by the second restricting part 520. At this time, the first restricting part 510 and the stopping part 310 substantially connect as a circle and form a restricting space 990.

Figure 7A:
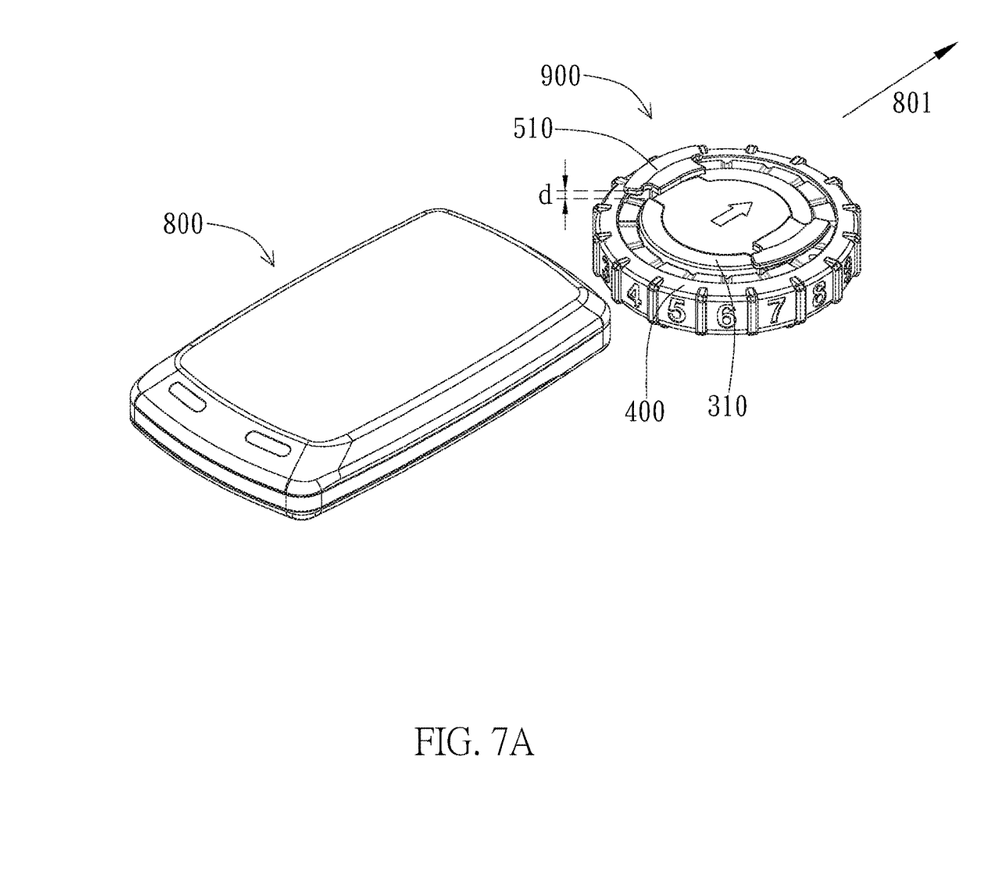
Figure 7B:
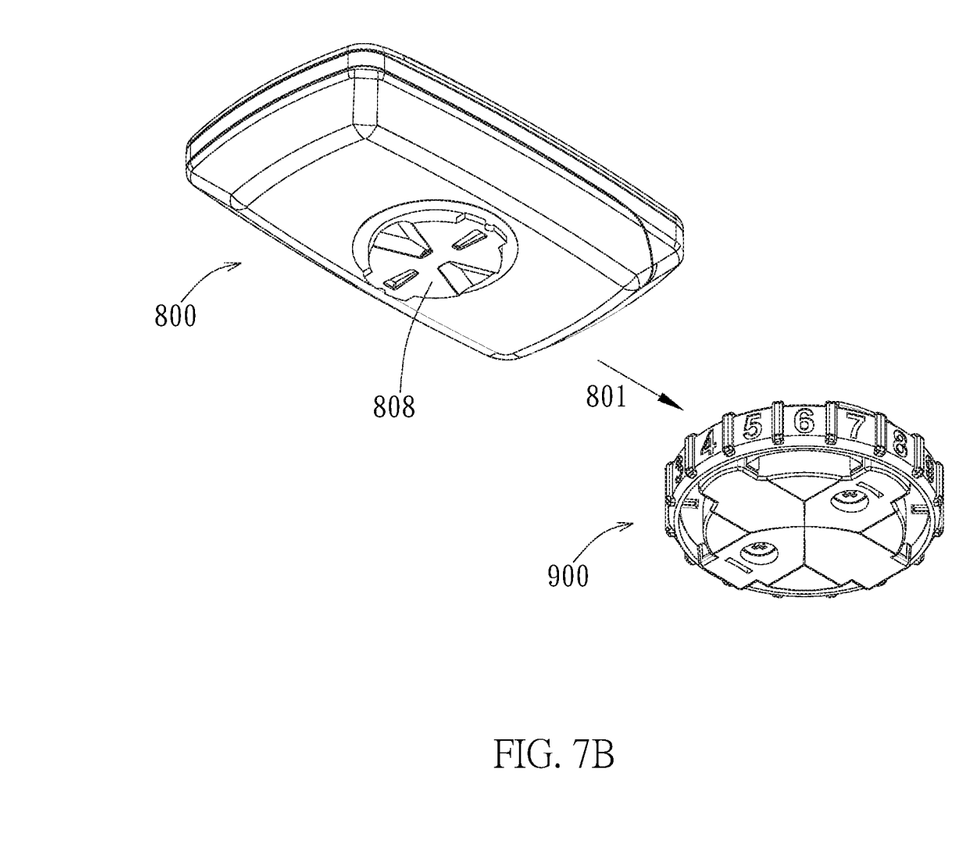
Figure 8A:
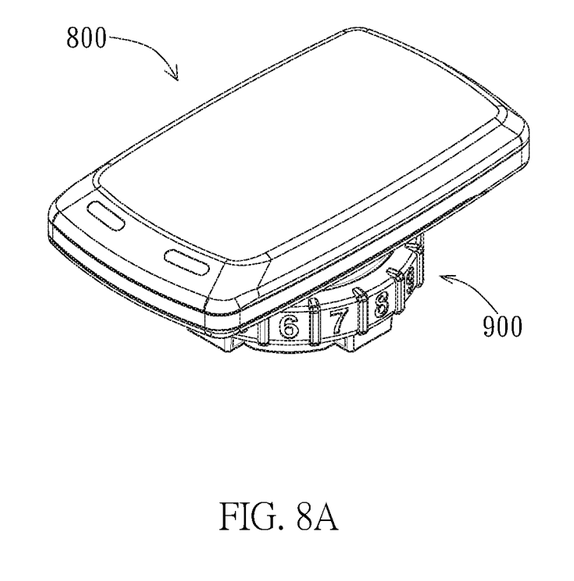
Figure 8B:
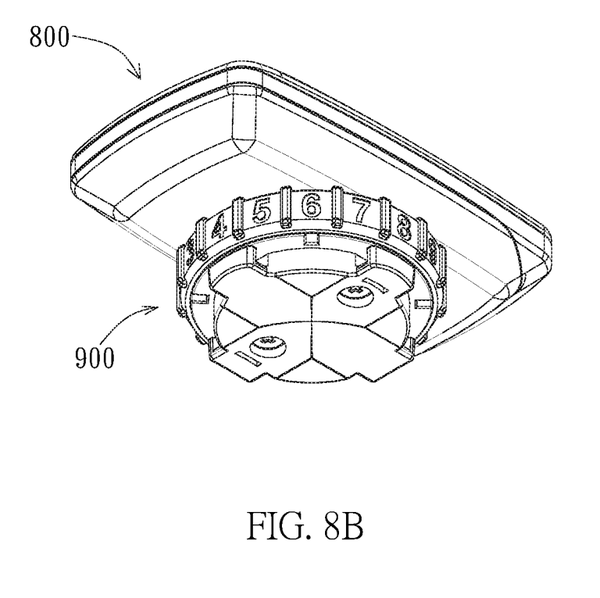

As shown in FIGS. 7A and 7B, when the rotating disc 400 is rotated to an unlock position, the rotating disc 400 as well as the numbering plate 200 and the stopper 300 can be moved toward the fixing base 100 with a distance d by applying a force, hence to release the restricting space 990. At this time, the electronic device 800 can move along the direction 801 and makes its fixing part 808 enter into the space between the first restricting parts 510, as shown in FIGS. 8A and 8B. After that, the rotating disc 400 as well as the numbering plate 200 and the stopper 300 move upward again in accordance with the elastic force of the elastic member 700, thus make the first restricting part 510 and the stopping part 310 substantially form the restricting space 990 to restrict the fixing part 808 in it, wherein the length and width of the fixing part 808 are respectively smaller to the distance between the two stopping parts 310 and the distance between the two fixing arms 502. At this time, the user can rotate the rotating disc 400 to a lock position to make the electronic device 800 locked by the lock 900, wherein the movement of the numbering plate 200 is restricted in the lock position.

Figure 9A:
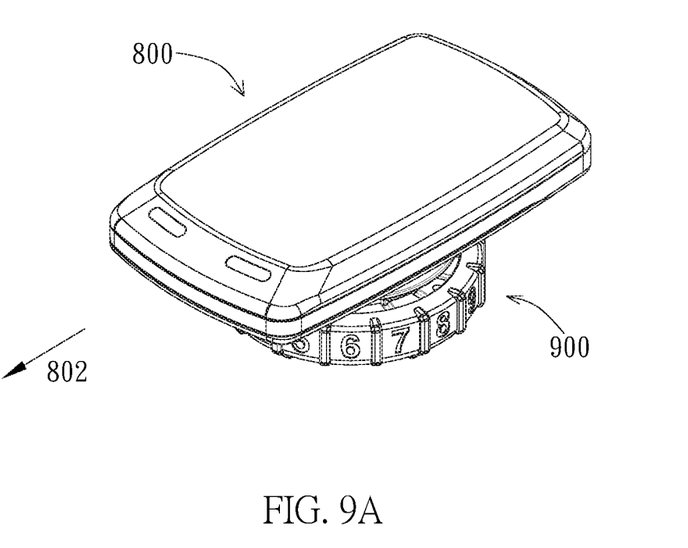
Figure 9B:
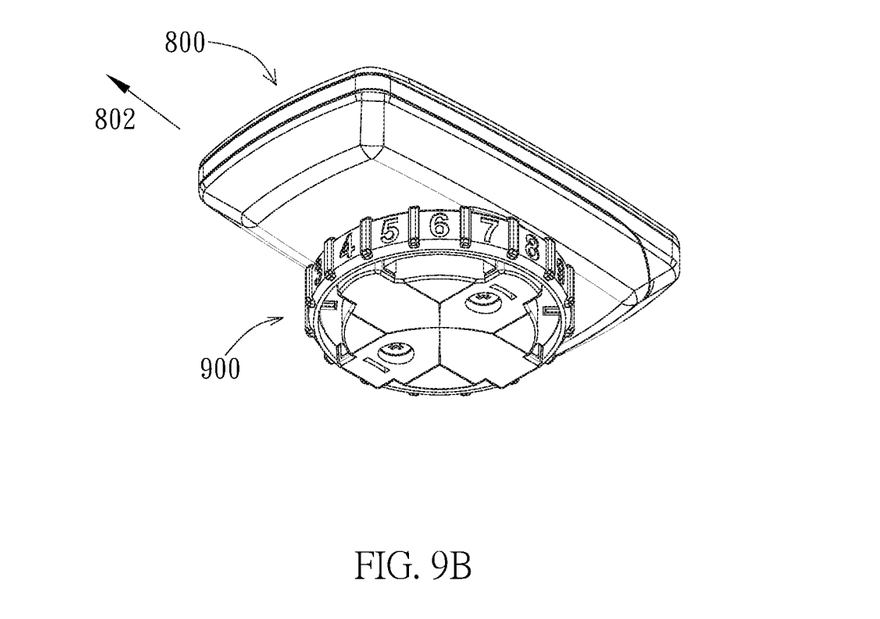

On the other hand, as shown in FIGS. 9A and 9B, for taking out the electronic device 800, the user merely rotates the rotating disc 400 to the unlock position and the rotating disc 400 is able to be forced to move toward the fixing base 100 to release the restricting space 990. At this time, the electronic device 800 is able to move along the direction 802 to leave lock 900.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A lock, comprising:
   a fixing base;
   an elastic member disposed on the fixing base;
   a stopper disposed above the elastic member, including:
   a stopper bottom plate;
   two stopping parts disposed on the opposite sides of the stopper bottom plate; and
   a linking-up side edge extending from the bottom end of the stopping part;
   a numbering plate disposed above the stopper, wherein at least a portion of the stopping part is able to pass through the numbering plate, wherein at least a portion of the linking-up side edge engages with the numbering plate;
   a rotating disc disposed above the numbering plate, wherein the rotating disc caps outside the numbering plate, the stopper, and at least a portion of the fixing base, wherein the rotating disc includes an inner flange engaging with the numbering plate; and a buckle seat disposed on the rotating disc, wherein the buckle seat includes:

a buckle bottom plate passing through the rotating disc and fixed on the fixing base, wherein the stopper bottom plate is disposed between the buckle bottom plate and the fixing base; and two fixing arms disposed on the opposite sides of the buckle bottom plate, wherein the upper end of the fixing arm respectively extends inward and outward the buckle seat to form a first restricting part and a second restricting part, wherein the inner flange is disposed between the second restricting part and the fixing base.

2. The lock of claim 1, wherein the numbering plate is circular.

3. The lock of claim 1, wherein the rotating disc is circular.

4. The lock of claim 1, wherein the numbering plate further has a slot disposed on the outer circumference of the numbering plate.

5. The lock of claim 3, wherein there are four slots disposed in symmetry.

6. The lock of claim 3, wherein the rotating disc further includes a positioning pin disposed with respect to the slot, wherein the positioning pin is movable in the slot.

7. A lock, comprising:

a fixing base;

a buckle seat disposed on the fixing base, wherein the buckle seat includes:

a buckle bottom plate fixed on the fixing base; and two fixing arms disposed on the opposite sides of the buckle bottom plate, wherein the upper end of the fixing arm respectively extends inward and outward the buckle seat to form a first restricting part and a second restricting part;

an elastic member disposed between the fixing base and the buckle seat;

a stopper disposed between the elastic member and the buckle seat, including:

a stopper bottom plate;

two stopping parts disposed on the opposite sides of the stopper bottom plate; and a linking-up side edge extending from the bottom end of the stopping part;

a numbering plate disposed between the stopper and the buckle seat, wherein at least a portion of the stopping part is able to pass through the numbering plate, wherein at least a portion of the linking-up side edge engages with the numbering plate; and a rotating disc disposed between the numbering plate and the buckle seat, wherein the rotating disc caps outside the numbering plate, the stopper, and at least a portion of the fixing base, wherein the rotating disc includes an inner flange engaging with the numbering plate, wherein the buckle bottom plate passes through the rotating disc and fixed on the fixing base.

8. The lock of claim 7, wherein the numbering plate is circular.

9. The lock of claim 7, wherein the rotating disc is circular.

10. The lock of claim 7, wherein the numbering plate further has a slot disposed on the outer circumference of the numbering plate.

11. The lock of claim 10, wherein there are four slots disposed in symmetry.

12. The lock of claim 10, wherein the rotating disc further includes a positioning pin disposed with respect to the slot, wherein the positioning pin is movable in the slot.

* * * * *